(12) United States Patent
Kinoshita

(10) Patent No.: US 12,368,829 B2
(45) Date of Patent: Jul. 22, 2025

(54) CONTROL METHOD AND DISPLAY SYSTEM

(71) Applicant: SEIKO EPSON CORPORATION, Tokyo (JP)

(72) Inventor: Shoichi Kinoshita, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 350 days.

(21) Appl. No.: 18/070,595

(22) Filed: Nov. 29, 2022

(65) Prior Publication Data
US 2023/0171386 A1 Jun. 1, 2023

(30) Foreign Application Priority Data
Nov. 29, 2021 (JP) .................................. 2021-192652

(51) Int. Cl.
*G03B 21/14* (2006.01)
*G06V 10/56* (2022.01)
*H04N 9/31* (2006.01)

(52) U.S. Cl.
CPC .......... *H04N 9/3194* (2013.01); *G06V 10/56* (2022.01); *H04N 9/3147* (2013.01)

(58) Field of Classification Search
CPC ..... H04N 9/3147; G03B 21/14; G03B 21/147
See application file for complete search history.

(56) References Cited

U.S. PATENT DOCUMENTS

| | | | |
|---|---|---|---|
| 2006/0181685 A1 | 8/2006 | Hasegawa | |
| 2011/0207504 A1* | 8/2011 | Anderson | A63F 13/213 |
| | | | 348/E5.022 |

FOREIGN PATENT DOCUMENTS

| | | |
|---|---|---|
| JP | 2006-229400 A | 8/2006 |
| JP | 2014-106386 A | 6/2014 |
| JP | 2019-197122 A | 11/2019 |

* cited by examiner

*Primary Examiner* — Ryan D Howard
(74) *Attorney, Agent, or Firm* — Dority & Manning, P.A.

(57) ABSTRACT

A control method includes a first projector receiving an input concerning a first instruction, the first projector displaying an instruction pattern corresponding to the first instruction, a second projector acquiring an image including the instruction pattern, and the second projector performing an operation corresponding to the instruction pattern. The instruction pattern includes a first figure having a first shape and a first color corresponding to content of the first instruction.

17 Claims, 10 Drawing Sheets

FIG. 8

| FIRST FIGURE | FUNCTION | INSTRUCTION PATTERN EXAMPLE 1 | INSTRUCTION PATTERN EXAMPLE 2 | INSTRUCTION PATTERN EXAMPLE 3 |
|---|---|---|---|---|
| (PURPLE) | INPUT SOURCE SWITCHING | SWITCH INPUT SOURCE TO HDMI TERMINAL | SWITCH INPUT SOURCE TO DVI TERMINAL | SWITCH INPUT SOURCE TO WIRELESS LAN |
| (YELLOW) | VOLUME SETTING | SET VOLUME TO "10" | SET VOLUME TO "50" | SET VOLUME TO MUTE |
| (BLUE) | LENS SHIFT SETTING | SET LENS SHIFT TO (100, 200) | SET LENS SHIFT TO (-100, -200) | SET LENS SHIFT TO (20, 20) |
| (GREEN) | LENS FOCUS SETTING | SET LENS FOCUS TO "100" | SET LENS FOCUS TO "50" | SET LENS FOCUS TO "200" |
| (ORANGE) | LENS ZOOM SETTING | SET LENS ZOOM TO "200" | SET LENS ZOOM TO "100" | SET LENS ZOOM TO "50" |
| (RED) | POWER SUPPLY SWITCHING | SWITCH POWER SUPPLY TO ON | SWITCH POWER SUPPLY TO OFF | |

FIG. 12
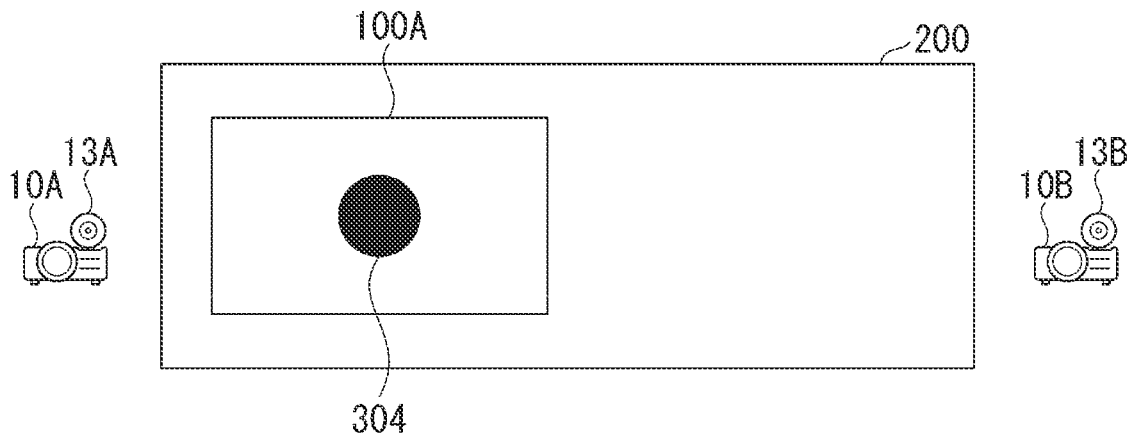
FIG. 13
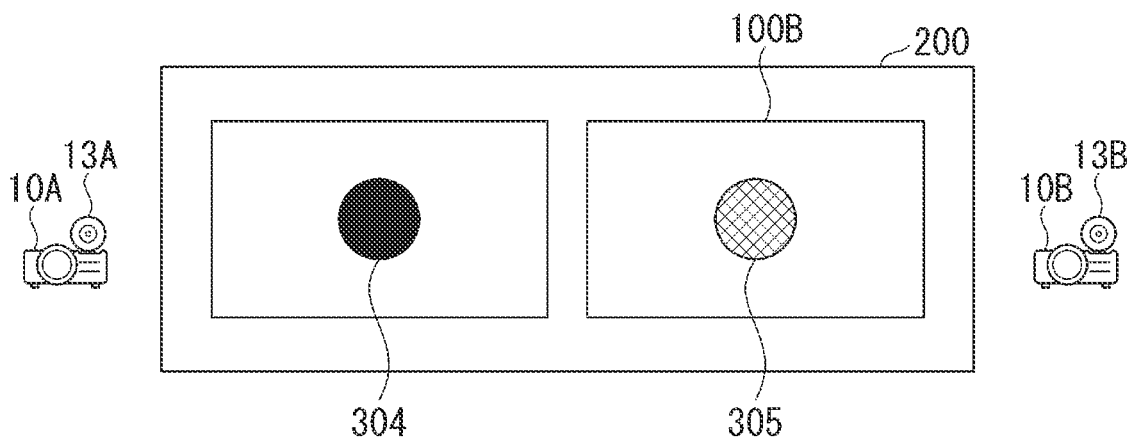
FIG. 14
| | INSTRUCTION NUMBER | CONTENT OF INSTRUCTION |
|---|---|---|
| | 1 | SWITCH INPUT SOURCE TO HDMI TERMINAL |
| ▷ | 2 | SWITCH INPUT SOURCE TO HDMI AND SET VOLUME TO "50" |
| | 3 | SET LENS ZOOM TO "200" AND SET LENS FOCUS TO "100" |
| | 4 | SET VOLUME TO MUTE AND SET LENS ZOOM TO "100" |
PLEASE SELECT AN INSTRUCTION YOU LIKE FROM THE INSTRUCTION LIST

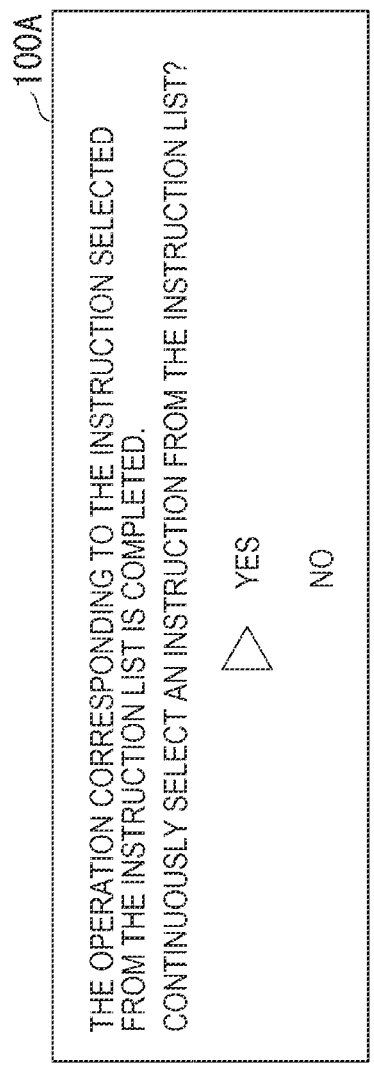

CONTROL METHOD AND DISPLAY SYSTEM

The present application is based on, and claims priority from JP Application Serial Number 2021-192652, filed Nov. 29, 2021, the disclosure of which is hereby incorporated by reference herein in its entirety.

BACKGROUND

1. Technical Field

The present disclosure relates to a control method and a display system.

2. Related Art

JP-A-2006-229400 discloses a technique in which a projector performing image projection earlier displays a projection position information transmission pattern and a tiling number transmission pattern and another projector joining tiling anew generates a processing parameter for processing display information of a projection image of the projector based on imaging information obtained by imaging the patterns.

The technique disclosed in JP-A-2006-229400 is a technique for displaying patterns necessary for the tiling after setting and adjustment of a plurality of projectors are performed. However, adjustment work is complicated because a user needs to approach target projectors and perform operation necessary for adjusting the projectors one by one until the adjustment of the projectors is completed.

SUMMARY

A control method according to an aspect of the present disclosure includes: a first projector receiving an input concerning a first instruction; the first projector displaying an instruction pattern corresponding to the first instruction; a second projector acquiring an image including the instruction pattern; and the second projector performing an operation corresponding to the instruction pattern. The instruction pattern includes a first figure having a first shape and a first color corresponding to content of the first instruction.

A display system according to an aspect of the present disclosure includes: a first projector including: an input device configured to receive an input concerning an instruction; at least one image generation panel configured to generate image light; a projection optical system configured to project the image light onto a projection surface; and at least one first processor configured to control the image generation panel to thereby display an instruction pattern corresponding to the instruction on the projection surface; and a second projector including: a camera configured to image the projection surface; and at least one second processor configured to control the camera, the at least one second processor executing: acquiring an image including the instruction pattern corresponding to the instruction from the camera; and performing an operation corresponding to the instruction pattern. The instruction pattern includes a first figure having a first shape and a first color corresponding to content of the instruction.

BRIEF DESCRIPTION OF THE DRAWINGS

FIG. 8 is a diagram showing an example of a plurality of instruction patterns including a first figure and a second figure.

FIG. 12 is a diagram showing a state in which the first projector displays an end pattern.

FIG. 13 is a diagram showing a state in which the second projector displays a response pattern.

FIG. 14 is a diagram showing an example of an instruction list displayed by the first projector.

FIG. 15 is a diagram showing an example of a first image including a message to the user.

DESCRIPTION OF EXEMPLARY EMBODIMENTS

Figure 1:
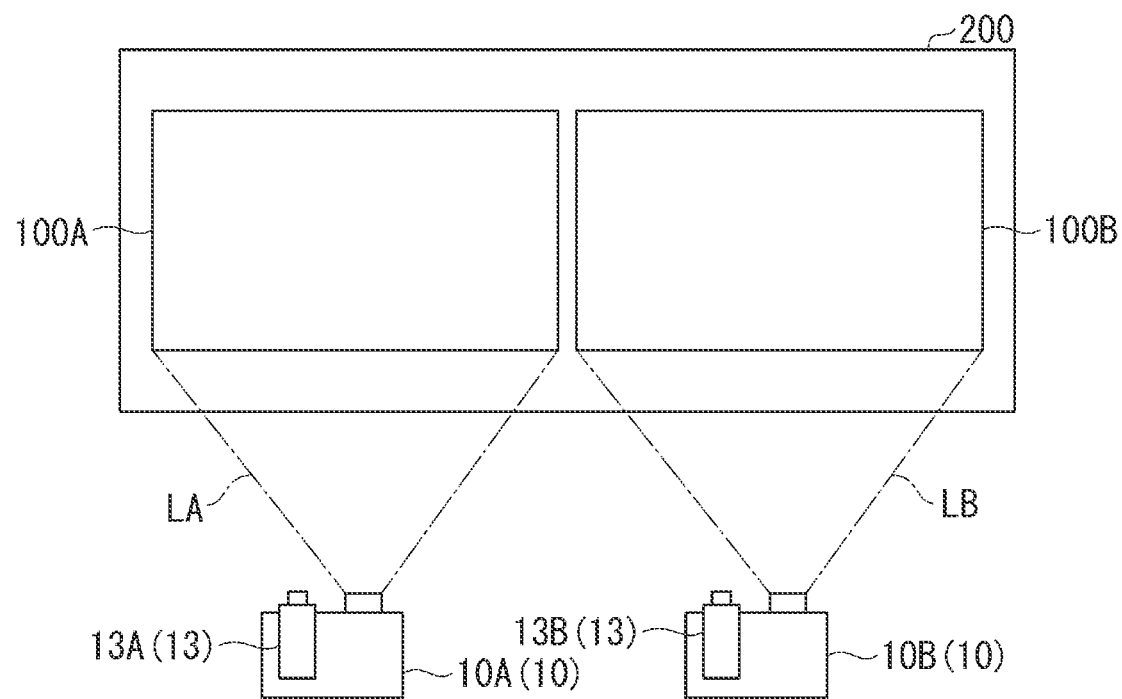
FIG. 1 is a diagram schematically showing a display system in an embodiment.

An embodiment of the present disclosure is explained below with reference to the drawings. In the drawings referred to below, scales of dimensions are sometimes differentiated and shown depending on components in order to clearly show the components.

FIG. 1 is a diagram schematically showing a display system in this embodiment. As shown in FIG. 1, the display system in this embodiment includes a first projector 10A and a second projector 10B. The first projector 10A and the second projector 10B respectively project image lights onto a projection surface 200 to thereby display images on the projection surface 200. The projection surface 200 may be a dedicated projector screen or may be a wall surface or the like.

The first projector 10A projects first image light LA onto the projection surface 200 to thereby display a first image 100A on the projection surface 200. The first projector 10A includes a first camera 13A that captures the projection surface 200. The second projector 10B projects second image light LB onto the projection surface 200 to thereby display a second image 100B on the projection surface 200. The second projector 10B includes a second camera 13B that captures the projection surface 200.

In FIG. 1, an example is shown in which the first image 100A and the second image 100B are displayed adjacent to each other in the lateral direction on the projection surface 200. However, a positional relation between the first image 100A and the second image 100B is not limited to the example shown in FIG. 1.

Configurations of the first projector 10A and the second projector 10B are explained below with reference to FIG. 2. The configurations of the first projector 10A and the second projector 10B are the same. Therefore, in the following explanation, the first projector 10A and the second projector 10B are collectively referred to as "projector 10" and a configuration of the projector 10 is explained.

Figure 2:
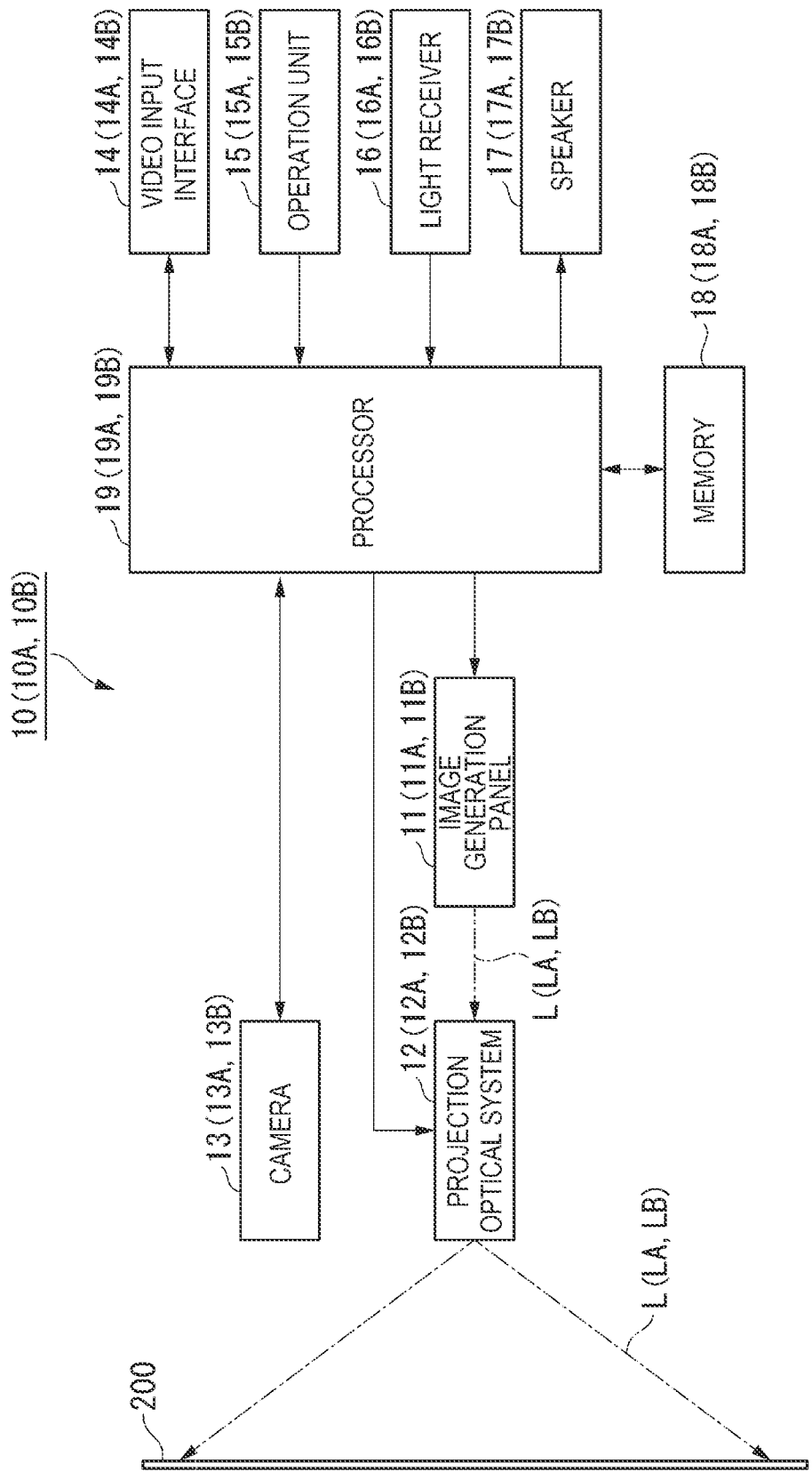
FIG. 2 is a block diagram showing a schematic configuration of a projector in the embodiment.

FIG. 2 is a block diagram showing a schematic configuration of the projector 10 in this embodiment. As shown in FIG. 2, the projector 10 includes at least one image generation panel 11, a projection optical system 12, a camera 13, a video input interface 14, an operation unit 15, a light receiver 16, a speaker 17, a memory 18, and at least one processor 19.

The image generation panel 11 generates and emits image light L representing an image. The image generation panel 11 is, for example, a self-luminous electrooptical device such as an OLED (Organic Light Emitting Diode) panel or a μLED (Micro Light Emitting Diode) panel or a non-self-luminous electrooptical device such as a liquid crystal panel or a DMD (Digital Micromirror Device). The image generation panel 11 includes a plurality of pixels arranged in a matrix shape. Each of the plurality of pixels emits visible light of any one of red light, green light, and blue light. Light emission amounts of the color lights are controlled for each of the pixels by the processor 19, whereby the image light L is emitted to the projection optical system 12 from the image generation panel 11.

In the following explanation, the image generation panel 11 included in the first projector 10A is sometimes referred to as "first image generation panel 11A" and the image generation panel 11 included in the second projector 10B is sometimes referred to as "second image generation panel 11B". The image light L emitted from the first image generation panel 11A of the first projector 10A is the first image light LA. The image light L emitted from the second image generation panel 11B of the second projector 10B is the second image light LB.

The projection optical system 12 is configured from a plurality of optical elements such as a lens and enlarges and projects the image light L emitted from the image generation panel 11 onto the projection surface 200. The image light L emitted from the image generation panel 11 is enlarged and projected onto the projection surface 200 by the projection optical system 12, whereby a color image visually recognizable by a user is displayed on the projection surface 200. Mechanisms that can adjust parameters such as lens shift, lens focus, and lens zoom are provided in the projection optical system 12. The mechanisms are controlled by the processor 19, whereby the parameters such as the lens shift, the lens focus, and the lens zoom in the projection optical system 12 are adjusted.

In the following explanation, the projection optical system 12 included in the first projector 10A is sometimes referred to as "first projection optical system 12A" and the projection optical system 12 included in the second projector 10B is sometimes referred to as "second projection optical system 12B". The first image light LA emitted from the first image generation panel 11A is enlarged and projected onto the projection surface 200 by the first projection optical system 12A, whereby the first image 100A visually recognizable by the user is displayed on the projection surface 200. The second image light LB emitted from the second image generation panel 11B is enlarged and projected onto the projection surface 200 by the second projection optical system 12B, whereby the second image 100B visually recognizable by the user is displayed on the projection surface 200.

The camera 13 captures the projection surface 200 according to an instruction from the processor 19 and outputs image data representing an image of the projection surface 200 to the processor 19. In the following explanation, the camera 13 included in the first projector 10A is sometimes referred to as "first camera 13A" and the camera 13 included in the second projector 10B is sometimes referred to as "second camera 13B".

The video input interface 14 is an interface that supports a plurality of video transmission standards such as the HDMI (High-Definition Multimedia Interface: registered trademark) and the DVI (Digital Visual Interface). Specifically, video input terminals such as an HDMI terminal and a DVI terminal are provided in the projector 10. The video input interface 14 converts video signals input via the video input terminals into signals processable by the processor 19 and outputs the signals to the processor 19. The video signals include an image signal, a sound signal, a control signal, and the like.

The video input interface 14 switches an input source according to an instruction from the processor 19. For example, when receiving an instruction to switch the input source to the HDMI terminal from the processor 19, the video input interface 14 converts the video signal input via the HDMI terminal into a signal processable by the processor 19 and outputs the signal to the processor 19. When receiving an instruction to switch the input source to the DVI terminal from the processor 19, the video input interface 14 converts the video signal input via the DVI terminal into a signal processable by the processor 19 and outputs the signal to the processor 19.

In the following explanation, the video input interface 14 included in the first projector 10A is sometimes referred to as "first video input interface 14A" and the video input interface 14 included in the second projector 10B is sometimes referred to as "second video input interface 14B".

The operation unit 15 is configured from a plurality of operation keys provided in the projector 10. For example, the operation keys include a power key, a menu call key, a cross key, a determination key, and a volume adjustment key. The operation keys may be hardware keys or may be software keys displayed on a touch panel. The operation unit 15 outputs electric signals generated by the operation keys being operated by the user to the processor 19 as operation signals. In the following explanation, the operation unit 15 included in the first projector 10A is sometimes referred to as "first operation unit 15A" and the operation unit 15 included in the second projector 10B is sometimes referred to as "second operation unit 15B". The operation unit 15 is an example of the input device.

The light receiver 16 includes a photoelectric conversion circuit that receives infrared light transmitted from a remote controller (not shown) of the projector 10 and converts the infrared light into an electric signal. The light receiver 16 outputs the electric signal obtained by the photoelectric conversion of the infrared light to the processor 19 as a remote operation signal. A plurality of operation keys are provided in the remote controller as in the operation unit 15. The remote controller convers electric signals generated by the operation keys provided in the remote controller being operated by the user into infrared light and transmits the infrared light to the projector 10. That is, the remote operation signal output from the light receiver 16 is substantially the same as the electric signals generated by the operation keys of the remote controller being operated by the user. The light receiver 16 is an example of the input device. When the remote controller transmits a radio wave signal according to a short range wireless communication standard such as Bluetooth (registered trademark), a reception device that receives the radio wave signal may be provided instead of the light receiver 16.

In the following explanation, the light receiver 16 included in the first projector 10A is sometimes referred to as "first light receiver 16A" and the light receiver 16 included in the second projector 10B is sometimes referred to as "second light receiver 16B".

The speaker 17 is controlled by the processor 19 to thereby output sound having predetermined volume. In the following explanation, the speaker 17 included in the first projector 10A is sometimes referred to as "first speaker 17A" and the speaker 17 included in the second projector 10B is sometimes referred to as "second speaker 17B".

The memory 18 includes a nonvolatile memory that stores programs necessary to cause the processor 19 to execute various kinds of processing, various setting data, and the like and a volatile memory used as a temporary storage destination of data when the processor 19 executes the various kinds of processing. The nonvolatile memory is, for example, an EEPROM (Electrically Erasable Programmable Read-Only Memory) or a flash memory. The volatile memory is, for example, a RAM (Random Access Memory).

In the following explanation, the memory 18 included in the first projector 10A is sometimes referred to as "first memory 18A" and the memory 18 included in the second projector 10B is sometimes referred to as "second memory 18B".

The processor 19 is an arithmetic processing device that controls an overall operation of the projector 10 according to a program stored in advance in the memory 18. Specifically, the processor 19 controls the image generation panel 11, the projection optical system 12, the camera 13, the video input interface 14, and the speaker 17 based on the operation signal output from the operation unit 15 and the remote operation signal output from the light receiver 16. The projector 10 may include a plurality of processors according to necessity.

In the following explanation, the processor 19 included in the first projector 10A is sometimes referred to as "first processor 19A" and the processor 19 included in the second projector 10B is sometimes referred to as "second processor 19B".

Figure 3:
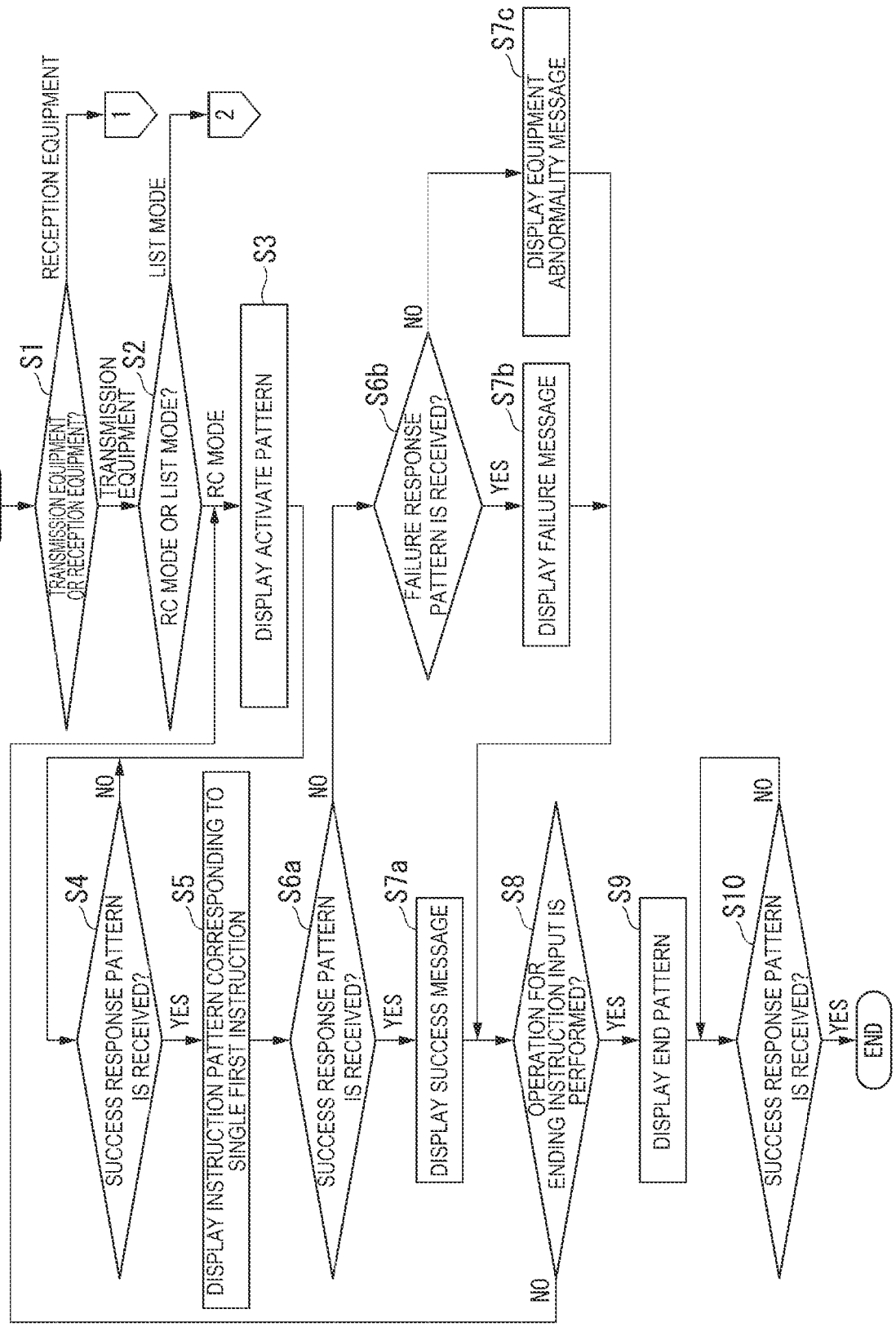
FIG. 3 is a first flowchart showing processing executed by a processor of the projector.
Figure 4:
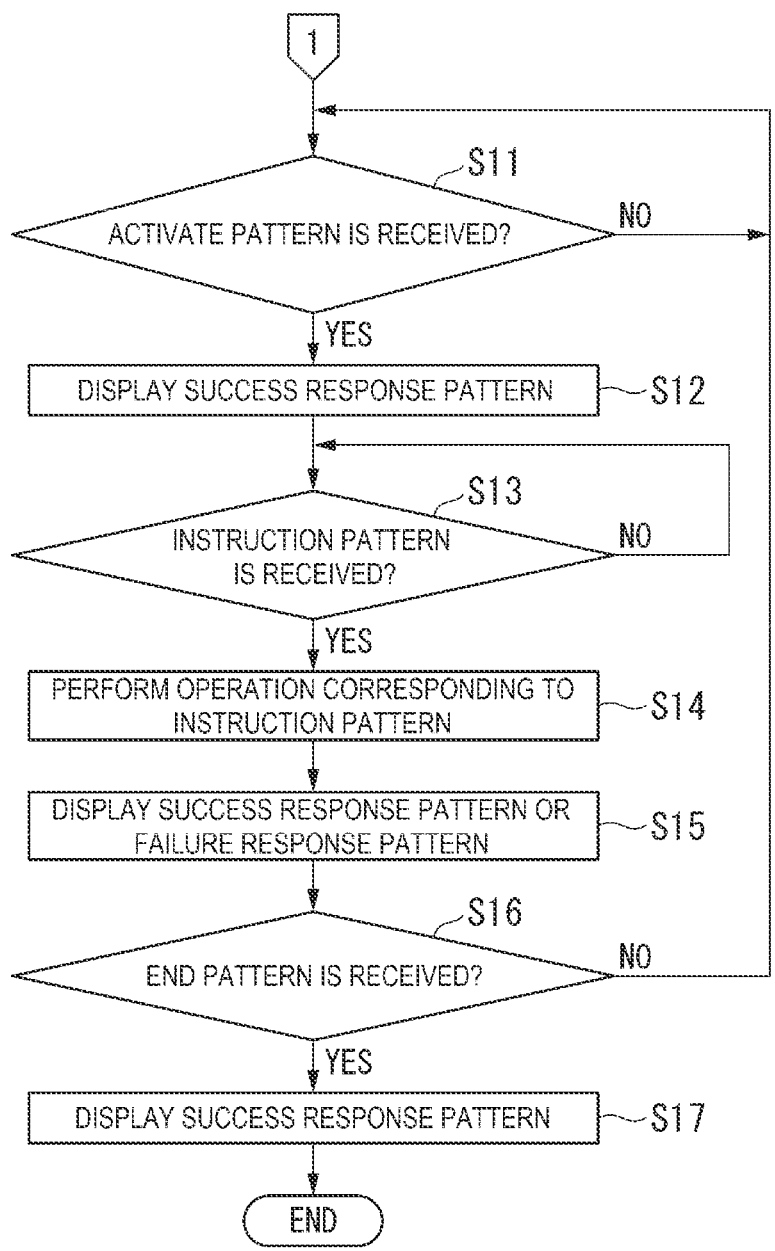
FIG. 4 is a second flowchart showing the processing executed by the processor of the projector.
Figure 5:
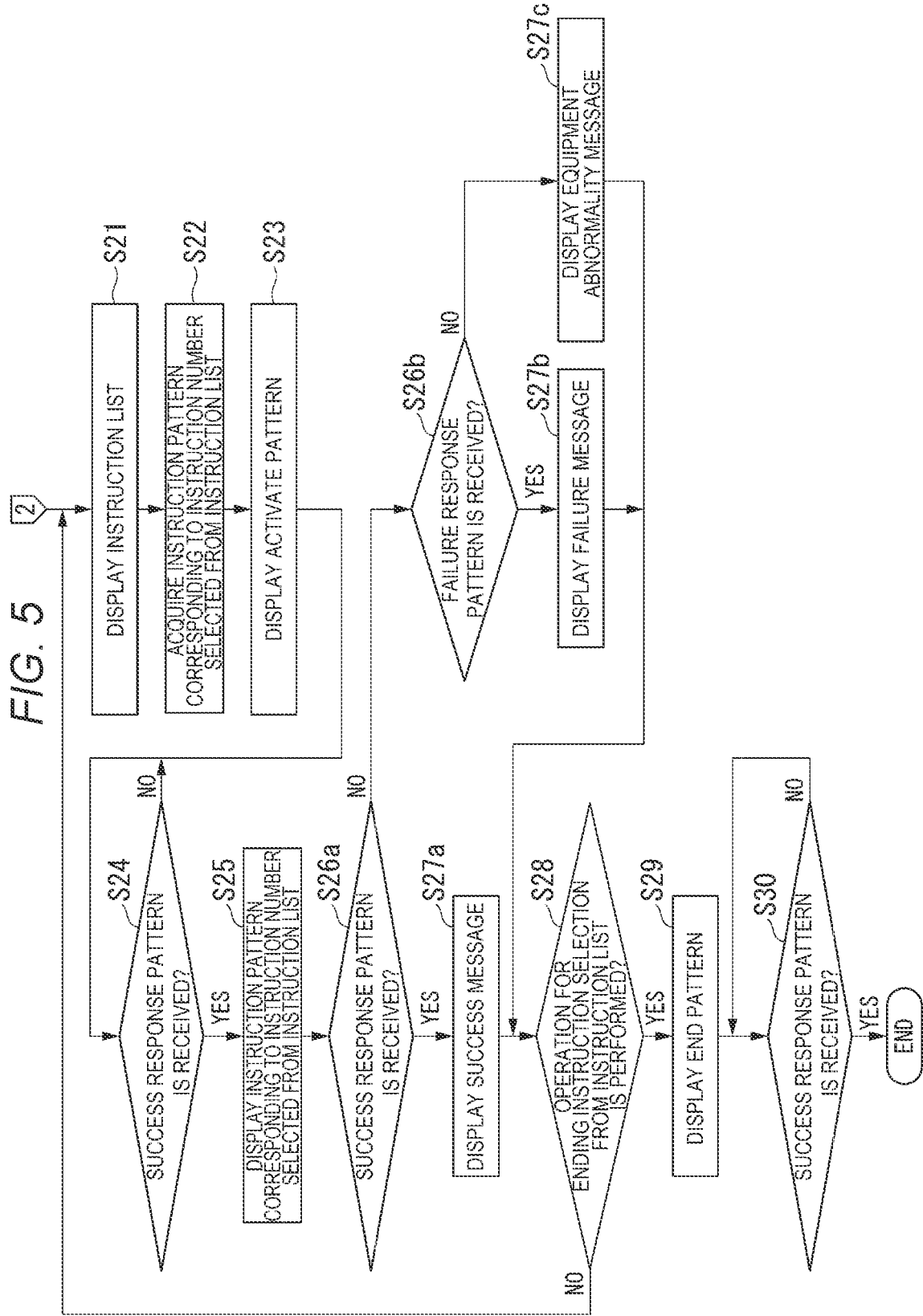
FIG. 5 is a third flowchart showing the processing executed by the processor of the projector.

When a camera control mode is set to "effective", the first processor 19A of the first projector 10A and the second processor 19B of the second projector 10B respectively read out programs from the first memory 18A and the second memory 18B and execute the programs to thereby execute processing shown in flowcharts of FIGS. 3, 4, and 5. In the following explanation, the camera control mode is abbreviated as "CC mode". The CC mode may be set to "effective" as default or may be set to "effective" at any timing by the user operating the remote controller or the like. FIG. 3 is a first flowchart showing processing executed by the processor 19 at the CC mode time. FIG. 4 is a second flowchart showing processing executed by the processor 19 at the CC mode time. FIG. 5 is a third flowchart showing processing executed by the processor 19 at the CC mode time.

A control method in this embodiment is realized by the processor 19 executing processing in the CC mode. The control method in this embodiment includes the first projector 10A receiving an input concerning a first instruction, the first projector 10A displaying an instruction pattern corresponding to the first instruction, the second projector 10B acquiring an image including the instruction pattern, and the second projector 10B performing an operation corresponding to the instruction pattern. Details of the instruction pattern are explained below.

As shown in FIG. 3, the first processor 19A of the first projector 10A and the second processor 19B of the second projector 10B respectively determine whether the first projector 10A and the second projector 10B are set as transmission equipment or set as reception equipment (step S1). The user operates the remote controller or the like, whereby each of the first projector 10A and the second projector 10B is set in advance as one of the transmission equipment and the reception equipment.

In this embodiment, it is assumed that the first projector 10A is set as the transmission equipment and the second projector 10B is set as reception equipment. In this case, the first processor 19A determines that the first projector 10A is set as the transmission equipment and shifts to step S2 shown in FIG. 3. On the other hand, the second processor 19B determines that the second projector 10B is set as the reception equipment and shifts to step S11 shown in FIG. 4.

As shown in FIG. 3, after determining that the first projector 10A is set as the transmission equipment, the first processor 19A determines whether an instruction input mode is a remote control mode or a list mode (step S2). In this embodiment, the remote control mode corresponds to a first mode and the list mode corresponds to a second mode different from the first mode. In the following explanation, the remote control mode is abbreviated as "RC mode". The instruction input mode of the first projector 10A is set to the RC mode or the list mode by the user operating the remote controller or the like.

When determining in step S2 that the instruction input mode is the RC mode, the first processor 19A shifts to step S3 shown in FIG. 3. On the other hand, when determining in step S2 that the instruction input mode is the list mode, the first processor 19A shifts to step S21 shown in FIG. 5. In the following explanation, first, an operation in the RC mode is explained and, subsequently, an operation in the list mode is explained.

Figure 6:
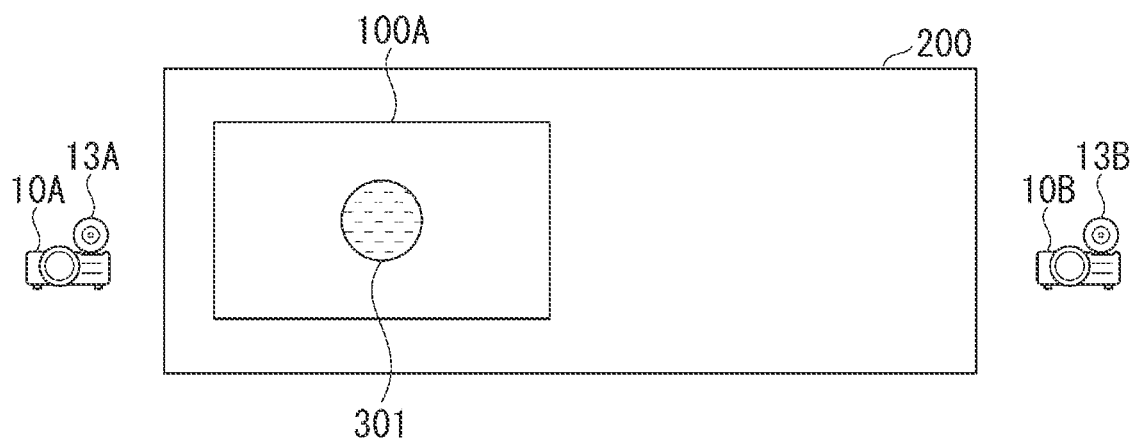
FIG. 6 is a diagram showing a state in which a first projector displays an activate pattern.

As shown in FIG. 3, after determining that the instruction input mode is set to the RC mode, the first processor 19A controls the first image generation panel 11A to thereby display the first image 100A including an activate pattern 301 on the projection surface 200 (step S3). FIG. 6 is a diagram showing a state in which the first projector 10A displays the activate pattern 301. As shown in FIG. 6, the activate pattern 301 included in the first image 100A is, as an example, a figure having a green color and a circular shape. The activate pattern 301 is an instruction pattern for notifying the second projector 10B to start an instruction of an operation. The activate pattern 301 may be an instruction pattern for causing the second projector 10B to start display on the projection surface 200.

After determining that the second projector 10B is set as the reception equipment, as shown in FIG. 4, the second processor 19B determines based on image data obtained from the second camera 13B whether the activate pattern 301 is received (step S11). In other words, in step S11, the second processor 19B determines based on the image data obtained from the second camera 13B whether an image including the activate pattern 301 is acquired.

Figure 7:
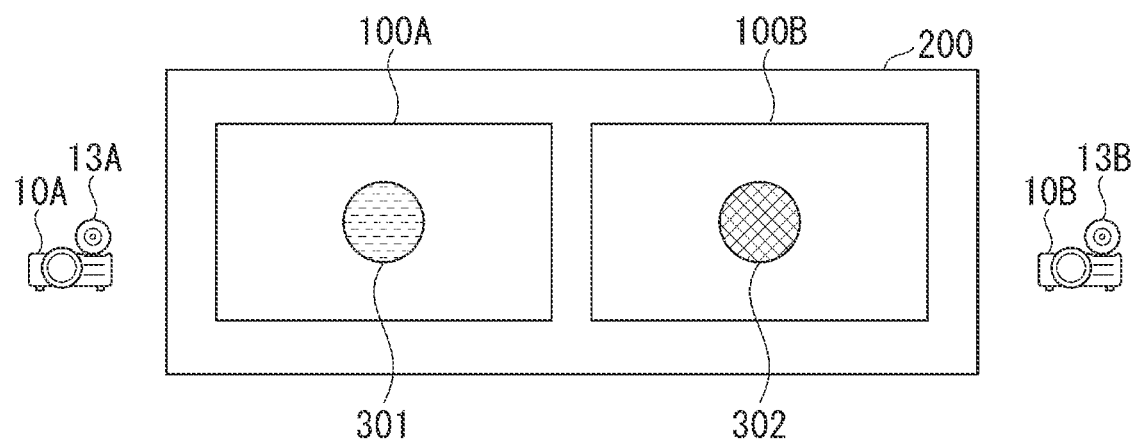
FIG. 7 is a diagram showing a state in which a second projector displays a response pattern to the activate pattern.

When receiving the activate pattern 301 (Yes in step S11), that is, when acquiring an image including the activate pattern 301, the second processor 19B controls the second image generation panel 11B to thereby display, on the projection surface 200, the second image 100B including a success response pattern 302 indicating that the reception of the activate pattern 301 is successful (step S12). FIG. 7 is a diagram showing a state in which the second projector 10B displays the success response pattern 302 to the activate pattern 301. As shown in FIG. 7, the success response pattern 302 included in the second image 100B is, as an example, a figure having a blue color and a circular shape.

On the other hand, when not receiving the activate pattern 301 (No in step S11), the second processor 19B stays on standby until determining that the activate pattern 301 is received. When failing in determining that the activate pattern 301 is received within a predetermined period, the second processor 19B may display a message for informing that the activate pattern 301 is unrecognizable.

As shown in FIG. 3, after displaying the first image 100A including the activate pattern 301, the first processor 19A determines based on image data obtained from the first camera 13A whether the success response pattern 302 is received (step S4). In other words, in step S4, the first processor 19A determines based on the image data obtained from the first camera 13A whether an image including the success response pattern 302 is acquired.

When receiving the success response pattern 302 (Yes in step S4), the first processor 19A controls the first image generation panel 11A based on a remote operation signal input from the first light receiver 16A to thereby display the first image 100A including the instruction pattern corresponding to the first instruction input via an operation key of the remote controller (step S5). The first processor 19A of the first projector 10A may, after receiving the success response pattern 302, display the first image 100A including a message for urging the user to operate the remote controller and input the first instruction. On the other hand, when not receiving the success response pattern 302 (No in step S4), the first processor 19A stays on standby until determining that the success response pattern 302 is received.

FIG. 8 shows an example of a plurality of instruction patterns. As shown in FIG. 8, an instruction pattern P includes a first figure P1 having a first shape and a first color corresponding to content of a first instruction. As an example, the first shape of the first figure P1 in this embodiment is a square. The first instruction means designating an operation executed by the projector 10 that images the instruction pattern P. The operation of the projector 10 includes setting a parameter of a function of the projector 10 to a designated value and executing the function according to the set parameter. The first color of the first figure P1 is set to a different color according to the function designated by the first instruction. In the first figure P1, the first shape can be considered designating a function and the first color can be considered representing a specific function.

For example, when the content of the first instruction relates to an input source switching function, the first color of the first figure P1 is set to purple. When the content of the first instruction relates to a volume setting function, the first color of the first figure P1 is set to yellow. When the content of the first instruction relates to a lens shift setting function, the first color of the first figure P1 is set to blue. When the content of the first instruction relates to a lens focus setting function, the first color of the first figure P1 is set to green. When the content of the first instruction relates to a lens zoom setting function, the first color of the first figure P1 is set to orange. When the content of the first instruction relates to a power supply switching function, the first color of the first figure P1 is set to red.

The instruction pattern P further includes one or a plurality of second figures P2 having a second shape and a second color and different from the first figure P1. As an example, the second shape of the second figure P2 in this embodiment is a triangle. The second color of the second figure P2 is represented by a gray scale and has a gradation value corresponding to the content of the first instruction. For example, the second color of the second figure P2 is set to a different gradation value according to a value of a parameter designated by the first instruction. In the second figure P2, the second shape can be considered representing designating a parameter and the second color can be considered representing a value of the parameter. Values of parameters represented by gradation values are decided for each function and are stored in the memory 18, for example, in a table format. The gray scale in this embodiment is a color that is zero in chroma and has any gradation value. The second color may be a color that is larger than zero in chroma and has any gradation value.

For example, when the content of the first instructions is content for "switching the input source to the HDMI terminal", the instruction pattern P includes the first figure P1, the first color of which is set to purple, and the second figure P2, the second color of which is set to white. When the content of the first instruction is content "switch the input source to the DVI terminal", the instruction pattern P includes the first figure P1, the first color of which is set to purple, and the second figure P2, the second color of which is set to black. When the content of the first instruction is content "switch the input source to the wireless LAN", the instruction pattern P includes the first figure P1, the first color of which is set to purple, and the second figure P2, the second color of which is set to gray corresponding to the "wireless LAN". As in this example, when not a numerical value but an item is designated, an item name or a setting value corresponding to the item is equivalent to the value of the parameter.

For example, when the content of the first instruction is content "set volume to "10"", the instruction pattern P includes the first figure P1, the first color of which is set to yellow, and the second figure P2, the second color of which is set to a gradation value corresponding to the volume "10". When the volume is "50", the instruction pattern P includes the second figure P2, the second color of which is set to a gradation value of a color, corresponding to the volume "50", darker than the second color in the case of the volume "10". When the content of the first instruction is content "set volume to mute", the instruction pattern P includes the first figure P1, the first color of which is set to yellow, and the second figure P2, the second color of which is set to black. In the following explanation, about the lens shift setting function, the lens focus function, and the lens zoom function, as in the volume setting function, numerical values are designated as parameters. Explanation of individual specific examples is omitted as appropriate because ideas are the same. However, if the projector 10 can specify a corresponding relation between the gradation values and the values of the parameters, a way of combining the gradation values and the values of the parameters is optional. The gradation values may be decided according to a rule that, for example, a smaller gradation value is allocated as the value is smaller or a smaller gradation value is allocated as the value is closer to zero.

For example, when the content of the first instruction is content "set the lens shift to (100, 200)", the instruction pattern P may include two second figures P2. In FIG. 8, the instruction pattern P includes the first figure P1, the first color of which is set to blue, the second figure P2, the second color of which is set to the gradation value corresponding to a lens shift (100) in an X-axis direction, and the second figure P2, the second color of which is set to a gradation value corresponding to the lens shift "200" in a Y-axis direction.

For example, when the content of the first instruction is content "set the lens focus to "100"", the instruction pattern P includes the first figure P1, the first color of which is set to green, and the second figure P2, the second color of which is set to a gradation value corresponding to the lens focus "100". When the content of the first instruction is content "set the lens zoom to "100"", the instruction pattern P includes the first figure P1, the first color of which is set to orange, and the second figure P2, the second color of which is set to a gradation value corresponding to the lens zoom "100".

For example, when the content of the first instruction is content "switch the power supply to ON", the instruction pattern P includes the first figure P1, the first color of which is set to red, and the second figure P2, the second color of which is set to white. When the content of the first instruction is content "switch the power supply to OFF", the instruction pattern P includes the first figure P1, the first color of which is set to red, and the second figure P2, the second color of which is set to black.

Figure 9:
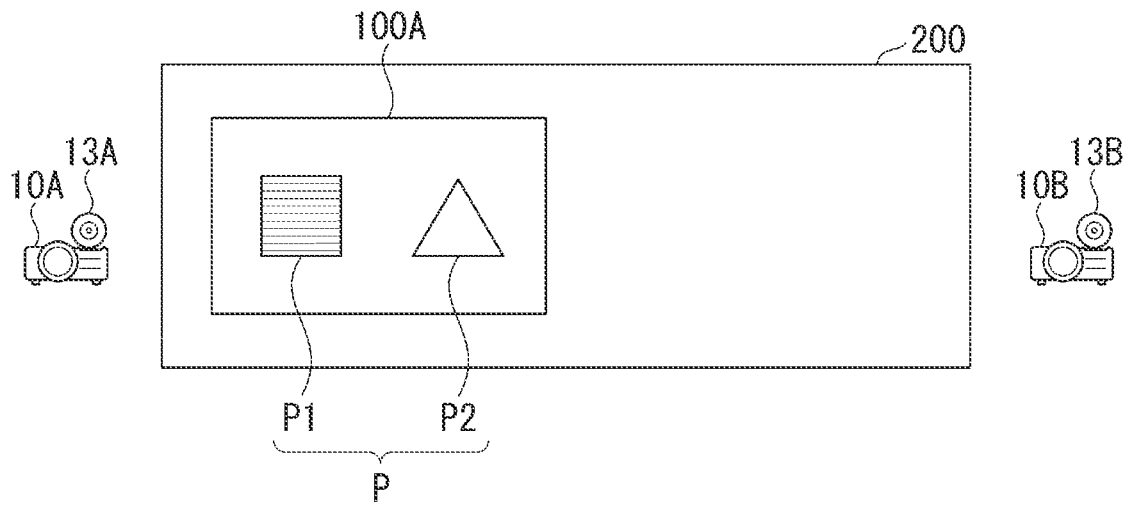
FIG. 9 is a diagram showing a state in which the first projector displays an instruction pattern.

Referring back to the flowchart, for example, in step S5 shown in FIG. 3, the first processor 19A receives, based on the remote operation signal input from the first light receiver 16A, receives an input of a single first instruction allocated to an operation key of the remote controller. The single first instruction is an instruction for individually designating a single function. For example, when determining that content of the single first instruction input via the operation key is content "switch the input source to the HDMI terminal", the first processor 19A controls the first image generation panel 11A to thereby display, on the projection surface 200, the instruction pattern P including the first figure P1, the first color of which is set to purple, and the second figure P2, the second color of which is set to white, as shown in FIG. 9. FIG. 9 is a diagram showing a state in which the first projector 10A displays the instruction pattern P.

The first processor 19A executes the processing in step S5 explained above, whereby "the first projector 10A receiving an input concerning a first instruction" and "the first projector 10A displaying an instruction pattern corresponding to the first instruction" in the control method in this embodiment are realized. As it is understood from the above explanation, in the control method in this embodiment, the receiving the input includes the first projector 10A receiving an input for designating the single first instruction when the instruction input mode is the RC mode (the first mode).

As shown in FIG. 4, after displaying the success response pattern 302 in step S12, the second processor 19B determines based on the image data obtained from the second camera 13B whether the instruction pattern P is received (step S13). In other words, in step S13, the second processor 19B determines based on the image data obtained from the second camera 13B whether an image including the instruction pattern P is acquired.

When receiving the instruction pattern P (Yes in step S13), that is, when acquiring the image including the instruction pattern P, the second processor 19B performs an operation corresponding to the instruction pattern P included in the acquired image (step S14). For example, when the instruction pattern P including the first figure P1, the first color of which is set to purple, and the second figure P2, the second color of which is set to white, is displayed by the first projector 10A as shown in FIG. 9, the second processor 19B instructs the second video input interface 14B to switch the input source to the HDMI terminal.

The second processor 19B executes the processing in step S14 explained above, whereby "the second projector 10B acquiring an image including the instruction pattern" and "the second projector 10B performing an operation corresponding to the instruction pattern" in the control method in this embodiment are realized. On the other hand, when not receiving the instruction pattern P (No in step S13), the second processor 19B stays on standby until determining that the instruction pattern P is received.

Figure 10:
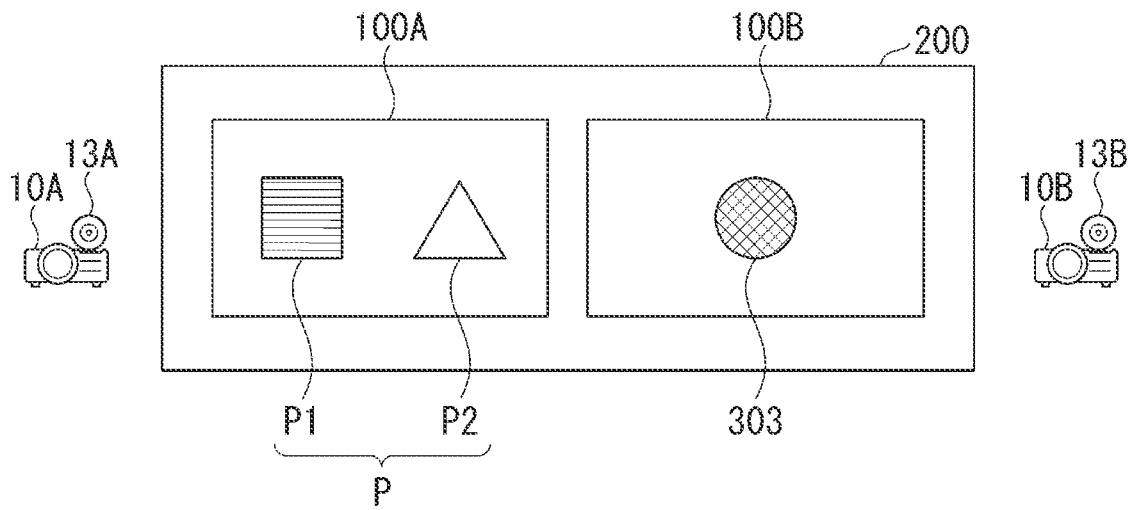
FIG. 10 is a diagram showing a state in which the second projector displays a response pattern.

After performing the operation corresponding to the received instruction pattern P, the second processor 19B controls the second image generation panel 11B to thereby display, on the projection surface 200, the second image 100B including a success response pattern 303 indicating that the operation corresponding to the instruction pattern P is successful as shown in FIG. 10 (step S15). FIG. 10 is a diagram showing a state in which the second projector 10B displays the success response pattern 303. As shown in FIG. 10, the success response pattern 303 indicating that the operation corresponding to the instruction pattern P is successful is, as an example, a figure having a blue color and a circular shape.

When the operation corresponding to the instruction pattern P is unsuccessful, in step S15, the second processor 19B displays, on the projection surface 200, the second image 100B including a failure response pattern indicating that the operation corresponding to the instruction pattern P is unsuccessful. Although not shown, the failure response pattern is, as an example, a figure having a red color and a circular shape. As it is understood from the above explanation of the step S15, the control method in this embodiment further includes, after the performing the operation, displaying a response pattern indicating whether the operation is successful. As explained above, the response pattern includes the success response pattern 303 indicating that the operation is successful and the failure response pattern indicating that the operation is unsuccessful.

As shown in FIG. 3, after displaying the instruction pattern P, the first processor 19A determines based on the image data obtained from the first camera 13A whether the success response pattern 303 is received (step S6a). In other words, in step S6a, the first processor 19A determines based on the image data obtained from the first camera 13A whether an image including the success response pattern 303 is acquired.

Figure 11:
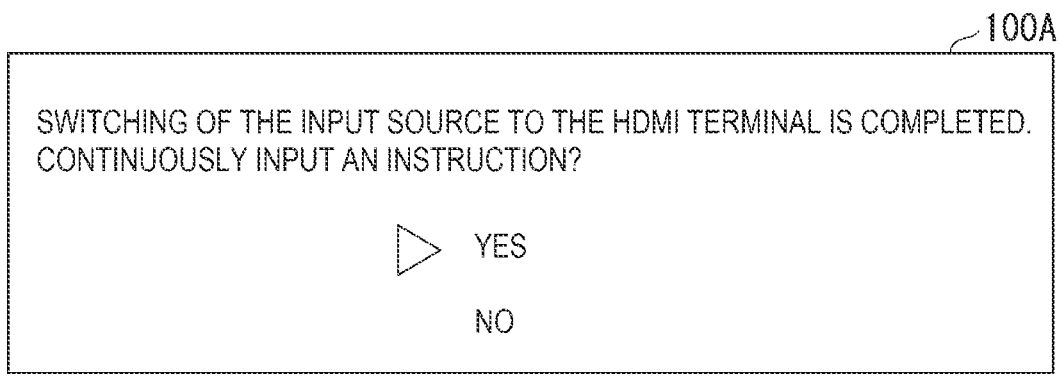
FIG. 11 is a diagram showing an example of a first image including a success message to a user.

When receiving the success response pattern 303 (Yes in step S6a), the first processor 19A controls the first image generation panel 11A to thereby display the first image 100A including a success message to the user (step S7a). FIG. 11 is a diagram showing an example of the first image 100A including the success message to the user. As shown in FIG. 11, the success message includes a first message for informing the user that the operation corresponding to the instruction pattern P is completed and a second message for inquiring the user whether to continuously perform the instruction input operation. As an example, the first message is "Switching of the input source to the HDMI terminal is completed". As an example, the second message includes a message "Continuously input an instruction?" and two choices of "YES" and "NO". After displaying the success message, the first processor 19A shifts to step S8.

When not receiving the success response pattern 303 (No in step S6a), the first processor 19A determines based on the image data obtained from the first camera 13A whether the failure response pattern is received (step S6b). In other words, in step S6b, the first processor 19A determines based on the image data obtained from the first camera 13A whether an image including the failure response pattern is acquired.

When receiving the failure response pattern (Yes in step S6b), the first processor 19A controls the first image generation panel 11A to thereby display the first image 100A including a failure message to the user (step S7b). Although not shown, the failure message includes a third message for informing the user that the operation corresponding to the instruction pattern P is unsuccessful and a second message for inquiring the user whether to continuously perform the instruction input operation. As an example, the third message is "Failed in switching the input source to the HDMI terminal". The second message of the failure message is the same as the second message of the success message. After displaying the failure message, the first processor 19A shifts to step S8.

When not receiving the failure response pattern (No in step S6b), that is, both of the success response pattern 303 and the failure response pattern are not displayed by the second projector 10B, the first processor 19A controls the first image generation panel 11A to thereby display the first image 100A including an equipment abnormality message to the user (step S7c). Although not shown, the equipment abnormality message includes a fourth message for informing the user that an abnormality has occurred in the second projector 10B operating as the reception equipment and a second message for inquiring the user whether to continuously perform the instruction input operation. As an example, the fourth message is "Please check a state of the reception equipment". The second message of the equipment abnormality message is the same as the second message of the success message. After displaying the equipment abnormality message, the first processor 19A shifts to step S8.

After executing any one of steps S7a, S7b and S7c, the first processor 19A determines based on the remote operation signal obtained from the first light receiver 16A whether operation for ending the instruction input is performed on the remote controller (step S8). In step S8, when determining based on the remote operation signal obtained from the first light receiver 16A that "YES" of the choices "YES" and "NO" included in any one of the success message, the failure message, and the equipment abnormality message is selected, the first processor 19A determines that the operation for ending the instruction input is not performed on the remote controller. On the other hand, when determining that "NO" is selected, the first processor 19A determines that the operation for ending the instruction input is performed on the remote controller.

When determining that the operation for ending the instruction input is not performed on the remote controller (No in step S8), the first processor 19A returns to step S3 and displays the activate pattern 301 again. On the other hand, when determining that the operation for ending the instruction input is performed on the remote controller (Yes in step S8), the first processor 19A controls the first image generation panel 11A to thereby display the first image 100A including an end pattern 304 (step S9). FIG. 12 is a diagram showing a state in which the first projector 10A displays the end pattern 304. As shown in FIG. 12, the end pattern 304 included in the first image 100A is, as an example, a figure having a black color and a circular shape.

As shown in FIG. 4, after displaying the success response pattern 303 or the failure response pattern in step S15, the second processor 19B determines based on the image data obtained from the second camera 13B whether the end pattern 304 is received (step S16). In other words, in step S16, the second processor 19B determines based on the image data obtained from the second camera 13B whether an image including the end pattern 304 is acquired.

When not receiving the end pattern 304 (No in step S16), that is, when not acquiring an image including the end pattern 304, the second processor 19B returns to step S11 and stays on standby until determining that the activate pattern 301 is received. On the other hand, when receiving the end pattern 304 (Yes in step S16), that is, when acquiring an image including the end pattern 304, the second processor 19B controls the second image generation panel 11B to thereby display the second image 100B including a success response pattern 305 indicating that the reception of the end pattern 304 is successful and, thereafter, ends the processing in the CC mode (step S17). FIG. 13 is a diagram showing a state in which the second projector 10B displays the success response pattern 305. As shown in FIG. 13, the success response pattern 305 indicating that the reception of the end pattern 304 is successful is, as an example, a figure having a blue color and a circular shape.

As shown in FIG. 3, after displaying the end pattern 304 in step S9, the first processor 19A determines based on the image data obtained from the first camera 13A whether the success response pattern 305 is received (step S10). In other words, in step S10, the first processor 19A determines based on the image data obtained from the first camera 13A whether an image including the success response pattern 305 is acquired. When receiving the success response pattern 305 (Yes in step S10), that is, when an image including the success response pattern 305 is acquired, the first processor 19A ends the processing in the CC mode. On the other hand, when the success response pattern 305 is not received (No in step S10), the first processor 19A stays on standby until determining that the success response pattern 305 is received.

As explained above, when determining that the instruction input mode is the RC mode, the first processor 19A of the first projector 10A set as the transmission equipment repeats, until operation for ending the instruction input is performed on the remote controller, the processing for displaying the instruction pattern P corresponding to the single first instruction input via the operation key of the remote controller. On the other hand, the second processor 19B of the second projector 10B set as the reception equipment repeats, until the end pattern 304 is received, the processing for acquiring an image including the instruction pattern P from the second camera 13B and the processing for performing an operation corresponding to the instruction pattern P.

Subsequently, an operation in the case in which the instruction input mode is the list mode is explained. When determining in step S2 that the instruction input mode is the list mode, the first processor 19A of the first projector 10A shifts to step S21 shown in FIG. 5. As shown in FIG. 5, when determining that the instruction input mode is the list mode, the first processor 19A controls the first image generation panel 11A to thereby display the first image 100A including an instruction list that is a list of preset instructions (step S21).

FIG. 14 shows an example of the instruction list displayed by the first projector 10A. As shown in FIG. 14, the instruction list indicates a correspondence relation between an instruction number and instruction content. For example, instruction content corresponding to an instruction number "1" is "switch the input source to the HDMI terminal". Instruction content corresponding to an instruction number "2" is "switch the input source to the HDMI terminal and set the volume to "50"". Instruction content corresponding to the instruction number "3" is "set the lens zoom to "200" and set the lens focus to "100"". Instruction content corresponding to an instruction number "4" is "set the volume to mute and set the lens zoom to "100"". In this way, the instructions included in the instruction list may be configured by only one instruction or may be configured by a combination of a plurality of instructions.

In the instruction list, when an instruction corresponding to one instruction number is configured by a combination of a plurality of instructions, the instruction list may include a first instruction set that includes a first instruction and a second instruction different from the first instruction. For example, among instructions included in the instruction list shown in FIG. 14, an instruction corresponding to the instruction number "2" corresponds to the first instruction set. In this case, in the instruction corresponding to the instruction number "2", an instruction to "switch the input source to the HDMI terminal" corresponds to the first instruction and an instruction to "set the volume to "50"" corresponds to the second instruction. Further, the instruction list may include a second instruction set that includes a third instruction and a fourth instruction different from the third instruction and is different from the first instruction set. For example, among the instructions included in the instruction list shown in FIG. 14, an instruction corresponding to the instruction number "3" corresponds to the second instruction set. In this case, in the instruction corresponding to the instruction number "3", an instruction to "set the lens zoom to "200"" corresponds to the third instruction and an instruction to "set the lens focus to "100"" corresponds to the fourth instruction.

As it is understood from the above explanation of step 21, the control method in this embodiment further includes displaying the instruction list when the instruction input mode is the list mode (the second mode) different from the RC mode (the first mode). As explained above, the instruction list includes the first instruction set that includes the first instruction and the second instruction different from the first instruction and the second instruction set that includes the third instruction and the fourth instruction different from the third instruction and is different from the first instruction set. In the example of the instruction list shown in FIG. 14, an instruction corresponding to one instruction number is configured by a combination of maximum two instructions. However, the instruction corresponding to one instruction number may be configured by a combination of three or more instructions.

As shown in FIG. 5, after displaying the instruction list in step S21, the first processor 19A acquires the instruction pattern P corresponding to an instruction number selected from the instruction list (step S22). For example, when determining based on the remote operation signal obtained from the first light receiver 16A that the instruction number "1" of the instruction list shown in FIG. 14 is selected, the first processor 19A acquires the instruction pattern P including the first figure P1, the first color of which is set to purple, and the second figure P2, the second color of which is set to white, (see FIG. 8). As it is understood from the above explanation of step S22, in the control method in this embodiment, the receiving the input includes receiving an input for selecting the first instruction set from the instruction list.

Subsequently, the first processor 19A controls the first image generation panel 11A to thereby display the first image 100A including the activate pattern 301 as shown in FIG. 6 (step S23). On the other hand, after determining that the second projector 10B is set as the reception equipment, as shown in FIG. 4, the second processor 19B determines based on the image data obtained from the second camera 13B whether the activate pattern 301 is received (step S11).

When receiving the activate pattern 301 (Yes in step S11), as shown in FIG. 7, the second processor 19B controls the second image generation panel 11B to thereby display, on the projection surface 200, the second image 100B including the success response pattern 302 indicating that the reception of the activate pattern 301 is successful (step S12). On the other hand, when not receiving the activate pattern 301 (No in step S11), the second processor 19B stays on standby until determining that the activate pattern 301 is received. When failing in determining that the activate pattern 301 is received within a predetermined time, the second processor 19B may display a message for informing that the activate pattern 301 is unrecognizable.

As shown in FIG. 5, after displaying the activate pattern 301 in step S23, the first processor 19A determines based on the image data obtained from the first camera 13A whether the success response pattern 302 is received (step S24). When receiving the success response pattern 302 (Yes in step S24), the first processor 19A controls the first image generation panel 11A to thereby display the first image 100A including the instruction pattern P corresponding to the instruction number selected from the instruction list (step S25). On the other hand, when not receiving the success response pattern 302 (No in step S24), the first processor 19A stays on standby until determining that the success response pattern 302 is received.

For example, when the instruction number "1" of the instruction list shown in FIG. 14 is selected, the first processor 19A controls the first image generation panel 11A to thereby display, on the projection surface 200, the instruction pattern P including the first figure P1, the first color of which is set to purple, and the second figure P2, the second color of which is set to white, as shown in FIG. 9.

For example, when the instruction number "2" of the instruction list shown in FIG. 14 is selected, first, the first processor 19A displays the instruction pattern P including the first figure P1, the first color of which is set to purple, and the second figure P2, the second color of which is set to white, and, thereafter, displays the instruction pattern P including the first figure P1, the first color of which is set to yellow, and the second figure P2, the second color of which is set to a gradation value corresponding to the volume "50".

As shown in FIG. 4, after displaying the success response pattern 302 in step S12, the second processor 19B determines based on the image data obtained from the second camera 13B whether the instruction pattern P is received (step S13).

When receiving the instruction pattern P (Yes in step S13), the second processor 19B performs an operation corresponding to the instruction pattern P included in an acquired image (step S14). On the other hand, when not receiving the instruction pattern P (No in step S13), the second processor 19B stays on standby until determining that the instruction pattern P is received. For example, when the instruction pattern P including the first figure P1, the first color of which is set to purple, and the second figure P2, the second color of which is set to white, is displayed by the first projector 10A as shown in FIG. 9, in step S14, the second processor 19B instructs the second video input interface 14B to switch the input source to the HDMI terminal.

For example, when the instruction number "2" of the instruction list shown in FIG. 14 is selected, after the instruction pattern P including the first figure P1, the first color of which is set to purple, and the second figure P2, the second color of which is set to white, is displayed first, the instruction pattern P including the first figure P1, the first color of which is set to yellow, and the second figure P2, the second color of which is set to a gradation value corresponding to the volume "50", is displayed. In this case, in step S14, the second processor 19B performs an operation corresponding to the two instruction patterns P included in the image acquired from the second camera 13B. That is, the second processor 19B instructs, based on the instruction pattern P displayed first, the second video input interface 14B to switch the input source to the HDMI terminal. The second processor 19B controls, based on the instruction pattern P displayed next, the second speaker 17B to set the volume to "50".

After performing the operation corresponding to the received instruction pattern P, by controlling the second image generation panel 11B, as shown in FIG. 10, the second processor 19B displays, on the projection surface 200, the second image 100B including the success response pattern 303 indicating that the operation corresponding to the instruction pattern P is successful (step S15). When the operation corresponding to the instruction pattern P is unsuccessful, in step S15, the second processor 19B displays, on the projection surface 200, the second image 100B including a failure response pattern indicating that the operation corresponding to the instruction pattern P is unsuccessful. For example, when performing operations corresponding to a plurality of instruction patterns P, the second processor 19B displays the successful response pattern 303 when all of the operations corresponding to the plurality of instruction patterns P are successful. When an operation corresponding to at least one instruction pattern P among the plurality of instruction patterns P is unsuccessful, the second processor 19B displays the failure response pattern.

As shown in FIG. 5, after displaying the instruction pattern P, the first processor 19A determines based on the image data obtained from the first camera 13A whether the success response pattern 303 is received (step S26a). In other words, in step S26a, the first processor 19A determines based on the image data obtained from the first camera 13A whether an image including the success response pattern 303 is acquired.

When receiving the success response pattern 303 (Yes in step S26a), the first processor 19A controls the first image generation panel 11A to thereby display the first image 100A including a success message to the user (step S27a). FIG. 15 is a diagram showing an example of the first image 100A including the success message to the user. As shown in FIG. 15, the success message includes a fifth message for informing that an operation corresponding to an instruction selected from the instruction list is completed and a sixth message for inquiring the user whether to continuously perform operation for selecting an instruction from the instruction list. As an example, the fifth message is "The operation corresponding to the instruction selected from the instruction list is completed". As an example, the sixth message includes a message "Continuously select an instruction from the instruction list?" and two choices of "YES" and "NO". After displaying the success message, the first processor 19A shifts to step S28.

When the success response pattern 303 is not received (No in step S26a), the first processor 19A determines based on the image data obtained from the first camera 13A whether the failure response pattern is received (step S26b). In other words, in step S26b, the first processor 19A determines based on the image data obtained from the first camera 13A whether an image including the failure response pattern is acquired.

When receiving the failure response pattern (Yes in step S26b), the first processor 19A controls the first image generation panel 11A to thereby display the first image 100A including a failure message to the user (step S27b). Although not shown, the failure message includes a seventh message for informing the user that the operation corresponding to the instruction selected from the instruction list is unsuccessful and a sixth message for inquiring the user whether to continuously perform the operation for selecting an instruction from the instruction list. As an example, the seventh message is "The operation corresponding to the instruction selected from the instruction list is unsuccessful". The sixth message of the failure message is the same as the sixth message of the success message. After displaying the failure message, the first processor 19A shifts to step S28.

When not receiving the failure response pattern (No in step S26b), that is, when both of the success response pattern 303 and the failure response pattern are not displayed by the second projector 10B, the first processor 19A controls the first image generation panel 11A to thereby display the first image 100A including an equipment abnormality message to the user (step S27c). Although not shown, the equipment abnormality message includes an eighth message for informing the user that an abnormality has occurred in the second projector 10B operating as the reception equipment and a sixth message for inquiring the user whether to continuously perform the operation for selecting an instruction from the instruction list. As an example, the eighth message is "Please check a state of the reception equipment". The sixth message of the equipment abnormality message is the same as the sixth message of the success message. After displaying the equipment abnormality message, the first processor 19A shifts to step S28.

After executing any one of steps S27a, S27b, and S27c, the first processor 19A determines based on the remote operation signal obtained from the first light receiver 16A whether operation for ending the instruction selection from the instruction list is performed on the remote controller (step S28). In step S28, when determining based on the remote operation signal obtained from the first light receiver 16A that "YES" of the choices of "YES" and "NO" included in any one of the success message, the failure message, and the equipment abnormality message is selected, the first processor 19A determines that the operation for ending the instruction selection from the instruction list is not performed on the remote controller. On the other hand, when determining that "NO" is selected, the first processor 19A determines that the operation for ending the instruction selection from the instruction list is performed on the remote controller.

When determining that the operation for ending the instruction selection from the instruction list is not performed on the remote controller (No in step S28), the first processor 19A returns to step S21 and displays the instruction list again. On the other hand, when determining that the operation for ending the instruction selection from the instruction list is performed on the remote controller (Yes in step S28), the first processor 19A controls the first image generation panel 11A to thereby display the first image 100A including the end pattern 304 as shown in FIG. 12 (step S29).

As shown in FIG. 4, after displaying the success response pattern 303 or the failure response pattern in step S15, the second processor 19B determines based on the image data obtained from the second camera 13B whether the end pattern 304 is received (step S16).

When not receiving the end pattern 304 (No in step S16), the second processor 19B returns to step S11 and stays on standby until determining that the activate pattern 301 is received. On the other hand, when receiving the end pattern 304 (Yes in step S16), as shown in FIG. 13, the second processor 19B controls the second image generation panel 11B to thereby display the second image 100B including the success response pattern 305 indicating that the reception of the end pattern 304 is successful and, thereafter, ends the processing in the CC mode (step S17).

As shown in FIG. 5, after displaying the end pattern 304 in step S29, the first processor 19A determines based on the image data obtained from the first camera 13A whether the success response pattern 305 is received (step S30). In other words, in step S30, the first processor 19A determines based on the image data obtained from the first camera 13A whether an image including the success response pattern 305 is acquired. When receiving the success response pattern 305 (Yes in step S30), that is, when acquiring the image including the success response pattern 305, the first processor 19A ends the processing in the CC mode. On the other hand, when not receiving the success response pattern 305 (No in step S30), the first processor 19A stays on standby until determining that the success response pattern 305 is received.

As explained above, when determining that the instruction input mode is the list mode, the first processor 19A of the first projector 10A set as the transmission equipment repeats, until operation for ending the instruction selection from the instruction list is performed on the remote controller, the processing for displaying the instruction list and the processing for displaying the instruction pattern P corresponding to the instruction selected from the instruction list. On the other hand, the second processor 19B of the second projector 10B set as the reception equipment repeats, until the end pattern 304 is received, the processing for acquiring an image including the instruction pattern P from the second camera 13B and the processing for performing an operation corresponding to the instruction pattern P.

Effects of the Embodiment

As explained above, the control method in this embodiment includes the first projector 10A receiving an input concerning a first instruction, the first projector 10A displaying the instruction pattern P corresponding to the first instruction, the second projector 10B acquiring an image including the instruction pattern P, and the second projector 10B performing an operation corresponding to the instruction pattern P. The instruction pattern P includes the first figure P1 having a first shape and a first color corresponding to content of the first instruction.

As explained above, when receiving the input concerning the first instruction, the first projector 10A displays the instruction pattern P corresponding to the first instruction. On the other hand, when acquiring the image including the instruction pattern P, the second projector 10B performs the operation corresponding to the instruction pattern P included in the acquired image. According to such an embodiment, when an image is displayed using a plurality of projectors 10, the user can perform adjustment work for the second projector 10B by inputting the first instruction to the first projector 10A. Therefore, according to this embodiment, unlike the related art, the user does not need to approach target projectors 10 and perform operation necessary for adjusting the projectors 10 one by one until the adjustment of the projectors 10 is completed. Therefore, it is possible to improve workability of adjustment work for the projectors 10. According to this embodiment, even under an environment in which a communication network is not maintained, it is possible to efficiently perform the adjustment work for the plurality of projectors 10.

In the control method in this embodiment, the first shape has five or less vertexes. For example, in this embodiment, the first shape of the first figure P1 is a square having four vertexes.

By forming the first figure P1 included in the instruction pattern P in a relatively simple shape in this way, it is possible to improve a success rate at the time when the second projector 10B identifies the first figure P1 based on an image including the instruction pattern P.

In the control method in this embodiment, the instruction pattern P further includes one or a plurality of second figures P2 having a second shape and a second color and different from the first figure P1.

Since the instruction pattern P includes the second figure P2 in addition to the first figure P1 in this way, it is possible to designate, in detail, according to a combination of the first figure P1 and the second figure P2, an operation that the user causes the second projector 10B to execute.

In this embodiment, the second shape has five or less vertexes. For example, in this embodiment, the second shape of the second figure P2 is a triangle having three vertexes.

By forming the second figure P2 included in the instruction pattern P in a relatively simple shape, it is possible to improve a success rate at the time when the second projector 10B identifies the second figure P2 based on an image including the instruction pattern P.

In this embodiment, the second color is represented by a gray scale and has a gradation value corresponding to content of the first instruction.

Consequently, it is possible to designate, more in detail, according to a combination of the first figure P1 and the second figure P2, an operation that the user causes the second projector 10B to execute.

In the control method in this embodiment, the receiving the input includes the first projector 10A receiving an input for designating a single first instruction when the instruction input mode is the first mode (the RC mode).

According to this embodiment, the user can individually designate a function that the user desires to execute, that is, an operation that the user causes the second projector 10B to execute. Therefore, flexibility of the adjustment work for the projector 10 is improved.

The control method in this embodiment further includes, when the instruction input mode is the second mode (the list mode) different from the first mode (the RC mode), displaying an instruction list including a first instruction set that includes a first instruction and a second instruction different from the first instruction and a second instruction set that includes a third instruction and a fourth instruction different from the third instruction and is different from the first instruction set, and the receiving the input includes receiving an input for selecting the first instruction set from the instruction list.

According to this embodiment, by selecting one instruction set from the instruction list, the user can cause the second projector 10B to execute a plurality of operations. Therefore, it is possible to simply and efficiently perform the adjustment work for the projector 10.

The control method in this embodiment further includes, after the performing the operation, the second projector 10B displaying a response pattern indicating whether the operation is successful.

Consequently, the first projector 10A can determine whether the second projector 10B has succeeded in performing an operation corresponding to the instruction pattern P and can execute appropriate processing according to a result of the determination.

The display system in this embodiment includes the first projector 10A including an input device (the first operation unit 15A and the first light receiver 16A) that receives an input concerning an instruction, at least one image generation panel (the first image generation panel 11A) that generates the image light L, a projection optical system (the first projection optical system 12A) that projects the image light L onto the projection surface 200, and at least one first processor 19A that controls the image generation panel to thereby display the instruction pattern P corresponding to the instruction on the projection surface 200 and the second projector 10B including a camera (the second camera 13B) that images the projection surface 200 and at least one second processor 19B that controls the camera, the at least one second processor 19B executing acquiring an image including the instruction pattern P corresponding to the instruction from the camera and performing an operation corresponding to the instruction pattern P. The instruction pattern P includes the first figure P1 having a first shape and a first color corresponding to content of the instruction.

With the display system in this embodiment, as in the control method in this embodiment, unlike the related art, the user does not need to approach target projectors 10 and perform operation necessary for adjusting the projectors 10 one by one until the adjustment of the projectors 10 is completed. Therefore, it is possible to improve workability of the adjustment work for the projectors 10. With the display system in this embodiment, even under an environment in which a communication network is not maintained, it is possible to efficiently perform the adjustment work for the plurality of projectors 10.

The technical scope of the present disclosure is not limited to the embodiment explained above. Various changes can be added in a range not departing from the gist of the present disclosure.

For example, in the embodiment, the form in which the first shape of the first figure P1 included in the instruction pattern P is the square is illustrated. However, the first shape of the first figure P1 is not limited to the square. In the embodiment, the form in which the second shape of the second figure P2 included in the instruction pattern P is the triangle is illustrated. However, the second shape of the second figure P2 is not limited to the triangle. The first shape of the first figure P1 and the second shape of the second figure P2 each are preferably a shape having five or less vertexes. That is, the first shape of the first figure P1 and the second shape of the second figure P2 each are preferably any one of a triangle, a square, and a pentagon. The first figure P1 and the second figure P2 are preferably different in at least one of a shape and a color.

In the embodiment, the form in which the instruction pattern P includes both of the first figure P1 and the second figure P2 is illustrated. However, the instruction pattern P may include only the first figure P1 if content of an instruction can be represented by a combination of the first shape and the first color.

In the embodiment, the form in which the display system is configured by the two projectors 10 is illustrated. However, the display system may be configured by three or more projectors 10. When the display system is configured by the three or more projectors 10, one projector 10 operating as transmission equipment needs to identify a plurality of projectors 10 operating as reception equipment. In this case, for example, a configuration may be adopted in which different figures for identification are allocated to the projectors 10 based on specific numbers of the projectors 10 and, when the projectors 10 display the instruction pattern P and the like, the projectors 10 display the figures for identification allocated to the projectors 10 together, whereby the three or more projectors 10 are capable of identifying one another. The specific number of the projector 10 is, for example, an MAC (Media Access Control) address or a manufacturing number.

In this embodiment, the form in which the image light L projected onto the projection surface 200 is generated by the one image generation panel 11. However, the image light L may be generated by a plurality of image generation panels. In this case, for example, the projector 10 may include three image generation panels and a prism. The three image generation panels include an image generation panel that generates red image light, an image generation panel that generates green image light, and an image generation panel that generates blue image light. The prism combines the red image light, the green image light, and the blue image light to thereby generate the image light L to be projected onto the projection surface 200.

A control method according to an aspect of the present disclosure may include the following configuration.

The control method according to the aspect of the present disclosure includes: a first projector receiving an input concerning a first instruction; the first projector displaying an instruction pattern corresponding to the first instruction; a second projector acquiring an image including the instruction pattern; and the second projector performing an operation corresponding to the instruction pattern. The instruction pattern includes a first figure having a first shape and a first color corresponding to content of the first instruction.

In the control method according to the aspect of the present disclosure, the first shape may have five or less vertexes.

In the control method according to the aspect of the present disclosure, the instruction pattern may further include one or a plurality of second figures having a second shape and a second color and different from the first figure.

In the control method according to the aspect of the present disclosure, the second shape may have five or less vertexes.

In the control method according to the aspect of the present disclosure, the second color may be represented by a gray scale and have a gradation value corresponding to content of the first instruction.

In the control method according to the aspect of the present disclosure, the receiving the input may include, when an instruction input mode is a first mode, the first projector receiving an input for designating a singularity of the first instruction.

The control method according to the aspect of the present disclosure may further include, when the instruction input mode is a second mode different from the first mode, displaying an instruction list including a first instruction set that includes the first instruction and a second instruction different from the first instruction and a second instruction set that includes a third instruction and a fourth instruction different from the third instruction and is different from the first instruction set, and the receiving the input may include receiving an input for selecting the first instruction set from the instruction list.

A display system according to an aspect of the present disclosure may include the following configuration.

The display system according to the aspect of the present disclosure includes: a first projector including: an input device configured to receive an input concerning an instruction; at least one image generation panel configured to generate image light; a projection optical system configured to project the image light onto a projection surface; and at least one first processor configured to control the image generation panel to thereby display an instruction pattern corresponding to the instruction on the projection surface; and a second projector including: a camera configured to image the projection surface; and at least one second processor configured to control the camera, the at least one second processor executing: acquiring an image including the instruction pattern corresponding to the instruction from the camera; and performing an operation corresponding to the instruction pattern. The instruction pattern includes a first figure having a first shape and a first color corresponding to content of the instruction.

What is claimed is:

1. A control method comprising:
receiving, by a first projector, an input concerning a first instruction;
displaying, by a first projector, an instruction pattern including a first figure having a first shape and a first color corresponding to the first instruction;
capturing, by a second projector, an image including the instruction pattern; and
performing, by a second projector, an operation corresponding to the instruction pattern,
wherein the receiving the input includes, when an instruction input mode is a first mode, receiving an input for designating a singularity of the first instruction.

2. The control method according to claim 1, wherein the first shape has five or less vertexes.

3. The control method according to claim 1, wherein the instruction pattern further includes one or a plurality of second figures having a second shape and a second color and different from the first figure.

4. The control method according to claim 3, wherein the second shape has five or less vertexes.

5. The control method according to claim 3, wherein the second color is represented by a gray scale and has a gradation value corresponding to content of the first instruction.

6. The control method according to claim 1, further comprising, when the instruction input mode is a second mode different from the first mode, displaying an instruction list including
a first instruction set that includes the first instruction and a second instruction different from the first instruction and
a second instruction set that includes a third instruction and a fourth instruction different from the third instruction and is different from the first instruction set, wherein
the receiving the input includes receiving an input for selecting the first instruction set from the instruction list.

7. The control method according to claim 1, further comprising, after the performing the operation, the second projector displaying a response pattern indicating whether or not the operation is successful.

8. A display system comprising:
a first projector including
an input device which receives an input concerning a first instruction,
at least one image generation panel which generates image light,
a projection optical system configured to project the image light onto a projection surface, and
at least one first processor programmed to control the image generation panel to display, on the projection surface, an instruction pattern including a first figure having a first shape and a first color corresponding to the first instruction; and
a second projector including
a camera which captures the projection surface, and
at least one second processor programmed to
acquire an image including the instruction pattern corresponding to the first instruction from the camera, and
perform an operation corresponding to the instruction pattern,
wherein when an instruction input mode of the at least one first processor is programmed for a first mode, the at least one first processor is programmed to receive an input for designating a singularity of the first instruction.

9. The display system according to claim 8, wherein the first shape has five or less vertexes.

10. The display system according to claim 8, wherein the instruction pattern further includes one or a plurality of second figures having a second shape and a second color and different from the first figure.

11. The display system according to claim 10, wherein the second shape has five or less vertexes.

12. The display system according to claim 8, further comprising, when the instruction input mode of the at least one first processor is programmed for a second mode different from the first mode, the at least one first processor is programmed to display an instruction list including
a first instruction set that includes the first instruction and a second instruction different from the first instruction and
a second instruction set that includes a third instruction and a fourth instruction different from the third instruction and is different from the first instruction set, wherein
the input concerning the first instruction includes an input for selecting the first instruction set from the instruction list.

13. The display system according to claim 8, wherein the at least one second processor is further programmed to, after performing the operation, causing the second projector to display a response pattern indicating whether or not the operation is successful.

14. A control method comprising:
receiving, by a first projector, an input concerning a first instruction;
displaying, by a first projector, an instruction pattern including a first figure having a first shape and a first color corresponding to the first instruction;
capturing, by a second projector, an image including the instruction pattern; and
performing, by a second projector, an operation corresponding to the instruction pattern,
wherein the instruction pattern further includes one or a plurality of second figures having a second shape and a second color and different from the first figure, and
the second color is represented by a gray scale and has a gradation value corresponding to content of the first instruction.

15. The control method according to claim 14, wherein the first shape has five or less vertexes.

16. The control method according to claim 14, wherein the second shape has five or less vertexes.

17. The control method according to claim 14, further comprising, after the performing the operation, the second projector displaying a response pattern indicating whether or not the operation is successful.

* * * * *